US011376459B2

(12) United States Patent
Bradley

(10) Patent No.: US 11,376,459 B2
(45) Date of Patent: Jul. 5, 2022

(54) ARRAY-BASED CAPACITANCE SENSOR DEVICE AND METHODS FOR THE DETECTION OF APPLIED STREAMS OF WATER OR OTHER EXTINGUISHANTS

(71) Applicant: LION GROUP, INC., Dayton, OH (US)

(72) Inventor: Brian P. Bradley, Albany, NY (US)

(73) Assignee: LION GROUP, INC., Dayton, OH (US)

( * ) Notice: Subject to any disclaimer, the term of this patent is extended or adjusted under 35 U.S.C. 154(b) by 12 days.

(21) Appl. No.: 16/943,714

(22) Filed: Jul. 30, 2020

(65) Prior Publication Data

US 2022/0023692 A1 Jan. 27, 2022

Related U.S. Application Data

(60) Provisional application No. 63/054,760, filed on Jul. 21, 2020.

(51) Int. Cl.
*A62C 99/00* (2010.01)
*G01N 27/22* (2006.01)
(52) U.S. Cl.
CPC ....... *A62C 99/0081* (2013.01); *G01N 27/223* (2013.01); *G01N 27/228* (2013.01)
(58) Field of Classification Search
USPC ................................................ 324/660–665
See application file for complete search history.

(56) References Cited

U.S. PATENT DOCUMENTS

| 4,001,949 A | 1/1977 | Francis |
| 4,932,243 A * | 6/1990 | Suh ...................... G01N 27/223 324/664 |
| 5,233,869 A | 8/1993 | Rogers et al. |

(Continued)

FOREIGN PATENT DOCUMENTS

EP        1905486 A1    4/2008

OTHER PUBLICATIONS

European Patent Office, Supplementary Search Report and Opinion, European Patent Application 14843333.7, 6 pages (dated Feb. 3, 2017).

(Continued)

*Primary Examiner* — Vincent Q Nguyen
(74) *Attorney, Agent, or Firm* — Thompson Hine LLP

(57) ABSTRACT

Devices and methods for the detection of streams of water or other extinguishants. A device has a substrate, an array including a plurality of capacitance sensors disposed on the substrate, and a controller operatively connected to each of the plurality of capacitance sensors to measure a capacitance of each respective sensor. The controller is configured to analyze a time-varying component of a series of measured capacitances for each sensor and to output a signal representing how closely that time-varying component matches a stored reference component of a reference signal in which a sensor is proximate to a stream of an extinguishant. A corresponding method obtains a series of measured capacitances from each of a plurality of capacitance sensors disposed upon a substrate, analyzes a time-varying component of the each of the series, and outputs a signal representing a degree of similarity between that series and such a reference signal.

20 Claims, 11 Drawing Sheets

(56) References Cited

U.S. PATENT DOCUMENTS

| | | | |
|---|---|---|---|
| 6,900,795 | B1 | 5/2005 | Knight, III et al. |
| 7,748,983 | B2 | 7/2010 | Blackburn et al. |
| 7,965,257 | B2 | 6/2011 | Perkins et al. |
| 8,096,810 | B2 | 1/2012 | Blackburn et al. |
| 8,362,970 | B2 | 1/2013 | Perkins et al. |
| 8,427,391 | B2 | 4/2013 | Perkins et al. |
| 9,773,424 | B2 | 9/2017 | Blackburn et al. |
| 2003/0214310 | A1* | 11/2003 | McIntosh ............ G01D 5/2405 324/658 |
| 2008/0158178 | A1 | 7/2008 | Hotelling |
| 2009/0197229 | A1 | 8/2009 | Blackburn |
| 2010/0304345 | A1 | 12/2010 | Blackburn et al. |
| 2015/0079558 | A1 | 3/2015 | Blackburn et al. |
| 2015/0142723 | A1 | 5/2015 | Loewenstein |
| 2016/0224158 | A1* | 8/2016 | Young ................ G01R 27/2605 |

OTHER PUBLICATIONS

PCT, U.S. Patent and Trademark Office (ISA/US), International Search Report and Written Opinion of the International Searching Authority, International Application No. PCT/US2014/055849, 10 pages (dated Dec. 22, 2014).

PCT, U.S. Patent and Trademark Office (ISA/US), International Search Report and Written Opinion of the International Searching Authority, International Application No. PCT/US2020/044284, 12 pages (dated Oct. 26, 2020).

* cited by examiner

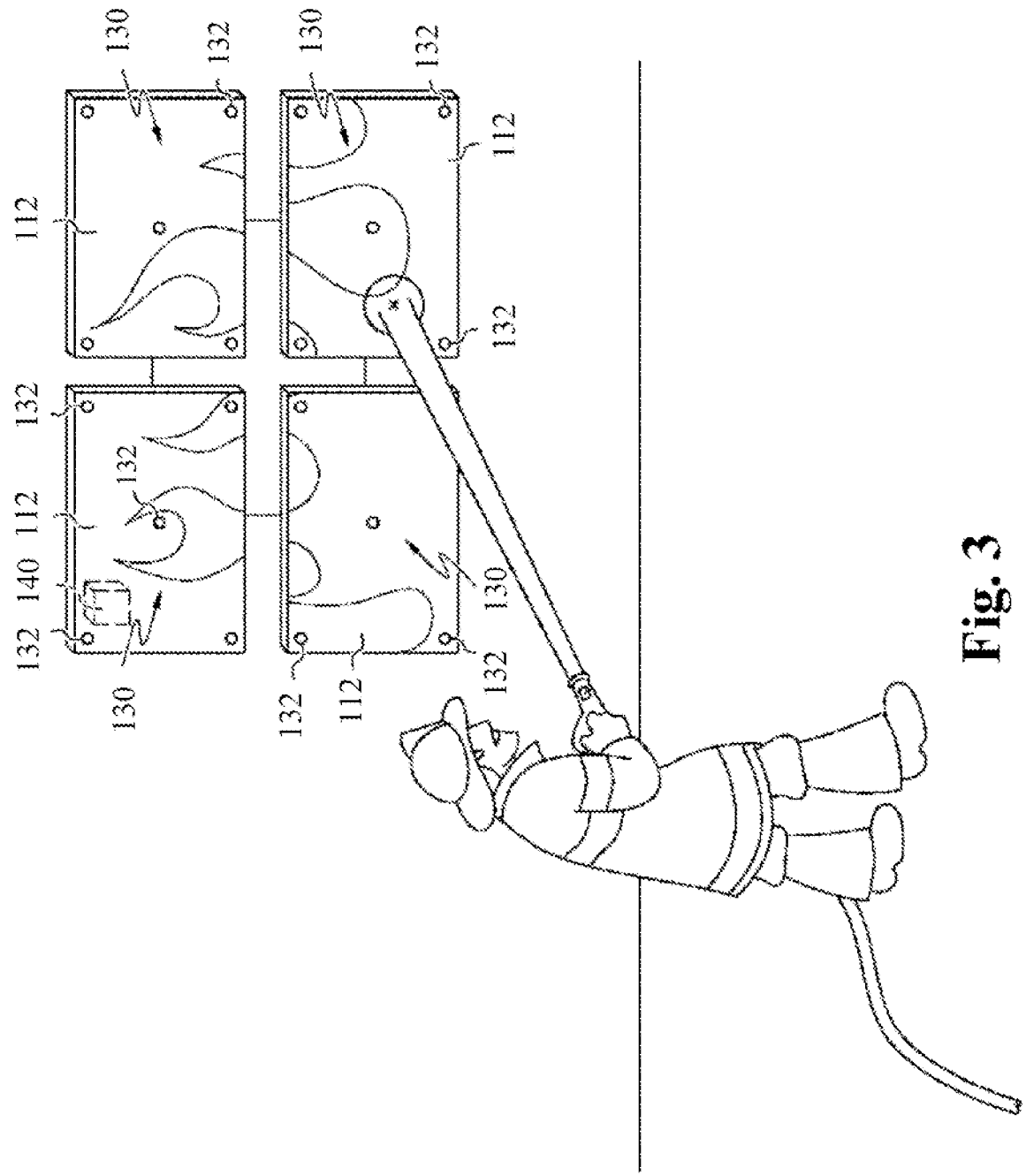

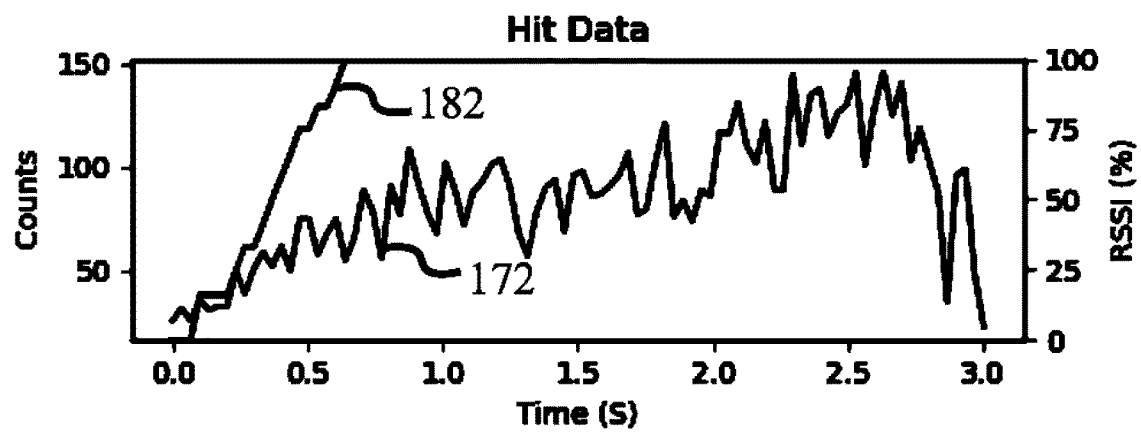
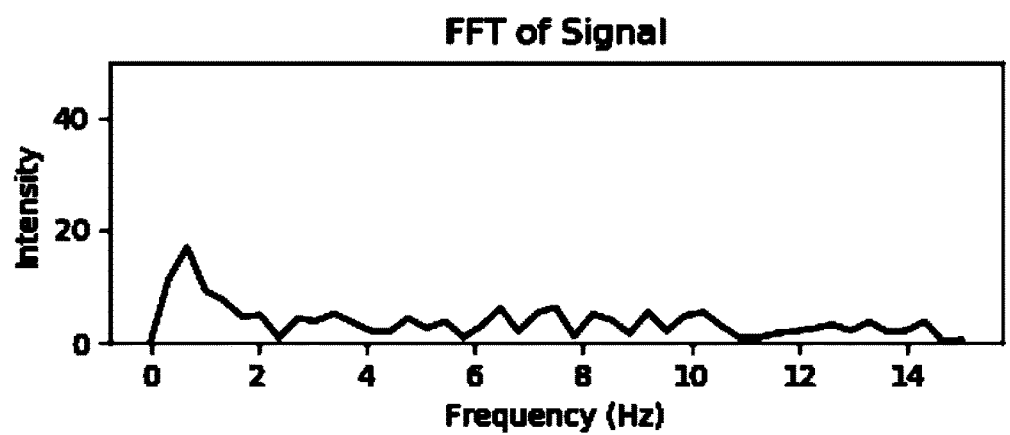
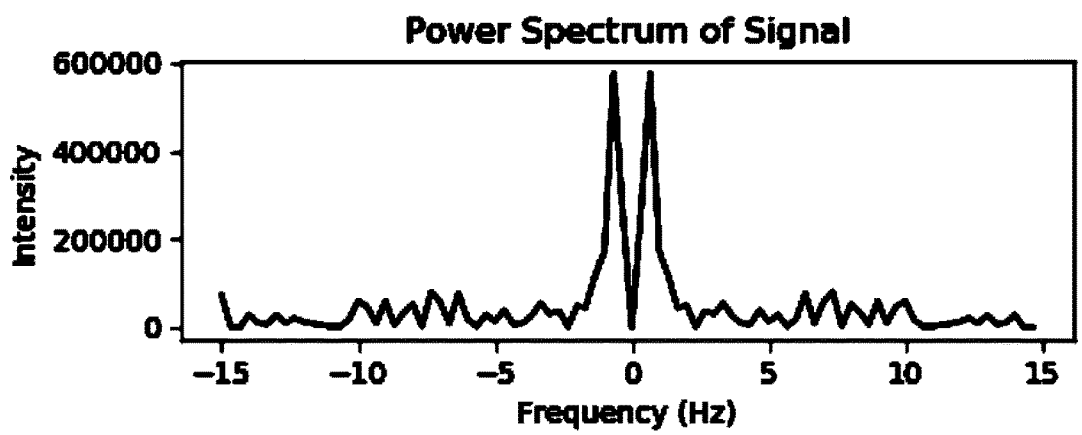
Fig. 6A

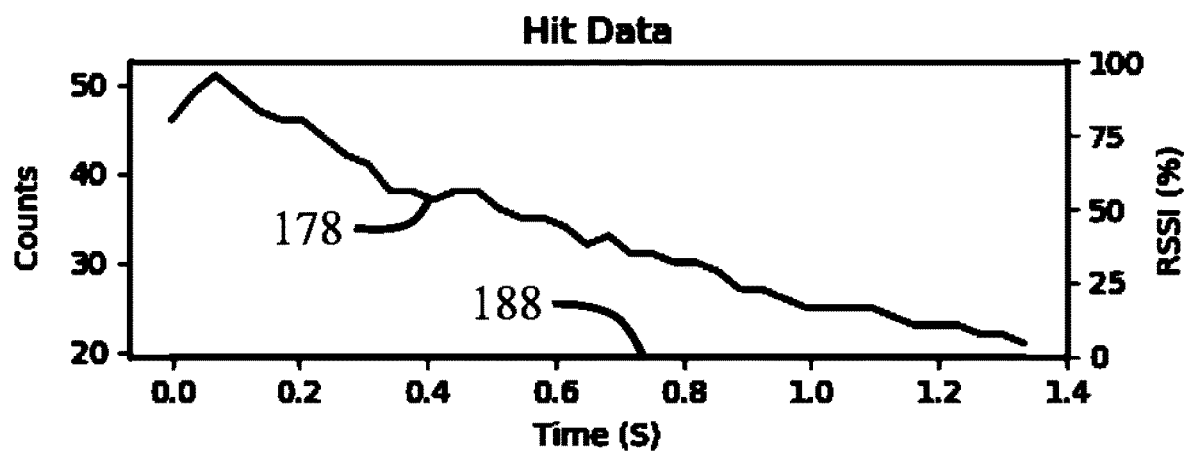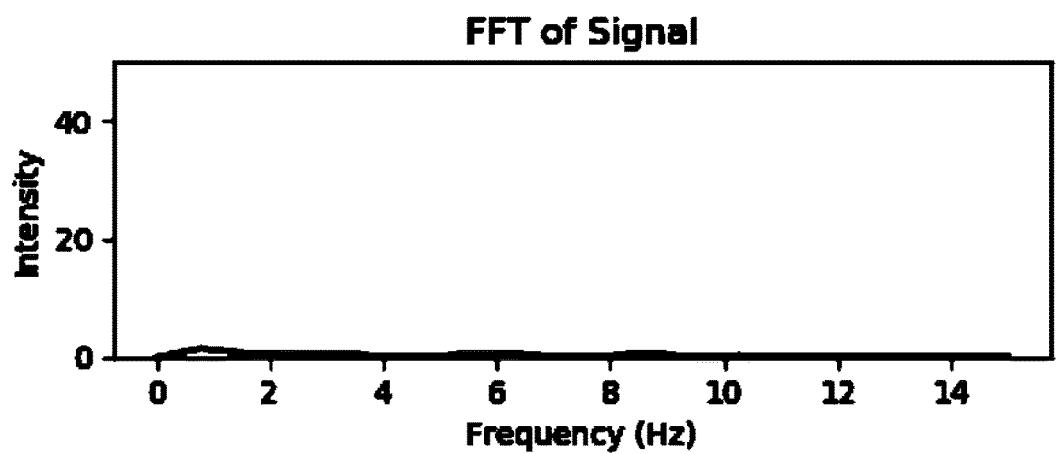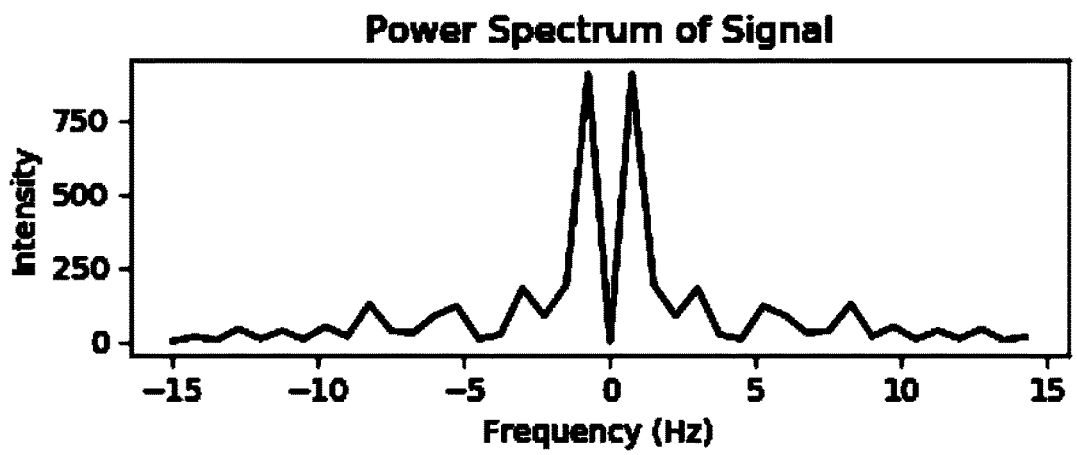
Fig. 6D

200

Calibrating at least one of a plurality capacitance sensors 132 disposed upon substrate(s) 112
210

- adjusting the driving power level of a capacitance sensor 110
212

- estimating parasitic capacitance 120 of a capacitance sensor 110
214

- establishing a reference component of a reference signal
216

- modeling a relationship between the reference component and distance
218

(Typical operation start point) → obtaining a series of measured capacitances from each of the plurality of capacitance sensors 132
220 analyzing a time-varying component of the series for each of the plurality of sensors
230

- calculating a power spectral density of the series within a preselected time window
232

- calculating a Fourier transform of the series within a preselected time window
240

- calculating a series of time-derivatives for the obtained series within a preselected time window
246

- calculating a metric for the power spectral density of the series
234

- comparing the Fourier transform to a reference component comprising a Fourier transform calculated for the reference signal
242

- calculating a set of metrics for the series of time-derivatives
248

- comparing the metric with a reference component including the same metric determined for the reference signal
236

- comparing the set of metrics with a reference component incuding the same metrics determined for the reference signal
250 outputting a signal based upon the analysis, representing the similarity of the obtained series to the reference signal
(238, 244, or 252)

Fig. 7

ARRAY-BASED CAPACITANCE SENSOR DEVICE AND METHODS FOR THE DETECTION OF APPLIED STREAMS OF WATER OR OTHER EXTINGUISHANTS

FIELD

The present disclosure is directed to devices and methods for the detection of applied streams of water or other extinguishants and, in particular, to devices and methods that measure and analyze capacitances within an array of sensors exposed to applied streams of water or other extinguishants for uses such as firefighter technical instruction and skills evaluation.

BACKGROUND

Mockups and simulators are often used to train firefighters and other individuals in proper firefighting techniques. Electronic simulators may provide a realistic but virtual firefighting environment by simulating flaming materials and their reactions to fire extinguishants. For some systems, it may be desirable to detect the application of actual or other tangible (mock) extinguishants to simulated flaming materials in order to enhance simulation quality and trainee immersion. Accurate detection of the application of such tangible extinguishants, as well as simulation of the reactions of flaming materials to such applications, may be used during technical instruction and/or skills evaluations in order to improve firefighting performance.

U.S. Pat. No. 9,773,424, which is incorporated into this disclosure by reference in its entirety, discloses a firefighting training system that detects the application of volumes of water (or other tangible extinguishants) through a form of temperature thresholding. In short, the system can detect water being applied to a target by heating one or more temperature sensors to an elevated setpoint temperature, for example through resistive heating of NTC thermistors, and measuring how much energy is required to maintain or restore that setpoint temperature. Water will draw heat out of the temperature sensor(s) at varying rates depending upon the volume of water applied, the temperature of the water, and the temperature of the ambient environment. However, in some cases (1) the sensor(s) may be relatively slow to respond (lag in response by 1-2 seconds) due to their mass, construction, mounting, and thermal resistance, as well as relatively slow to recover due to the need to reheat the sensor and any water clinging thereto, (2) the temperature of the water and/or environment may be poorly controlled, leading to exaggerated or reduced simulation response due to differences from an assumed or previously measured temperature, (3) heated temperature sensor devices can be relatively costly and may require significant amounts of power when exposed to large volumes of water, (4) implementation may be difficult due to inter-sensor variation in heat transfer characteristics and/or sensor driver saturation upon exposure to large volumes of water, and (5) such sensor(s) are usually unable to discriminate between true responses from applied streams of water and false responses caused by runoff from more elevated portions of a target or pooling around the base of a target.

SUMMARY

The applicant has developed improved devices and methods which measure and analyze capacitances between a plurality of sensors and a stream of extinguishant impacting upon or proximate to those sensors in order to detect the presence of and determine the location of the impacting stream. The devices and methods may essentially eliminate extinguishant and environmental temperature as factors affecting detection versus non-detection, addressing the above-described issues with response time, temperature control, power consumption, and lack of discrimination between actively applied and expended extinguishants. The devices may also respond at a comparatively fast rate so as to enable analysis of a series of measurements taken at comparatively high frequency versus thermistor-based devices and allow for an analysis to determine true positives (impact by a stream) versus false positives (e.g., exposure to runoff). The devices may have a simplified construction with comparatively low energy requirements due to the use of capacitive sensing, permitting the powering, calibration, and analysis of individual sensor outputs via low voltage, low current circuitry. The reduced power requirements may also allow for the use of highly integrated analog-to-digital or so-called "capacitance-to-digital" converters, simplifying the implementation of arrays of such sensor devices.

In a first aspect, a disclosed device has a substrate, a sensing array including a plurality of capacitance sensors disposed on the substrate, and a controller operatively connected to each of the plurality of capacitance sensors to measure a capacitance of each respective capacitance sensor. The controller is configured to analyze a time-varying component of a series of measured capacitances for each capacitance sensor and to output signal representing how closely that time-varying component matches a stored reference component of a reference signal in which one of the plurality of capacitance sensors is proximate to a stream of an extinguishant.

In a second aspect, a disclosed method includes the steps of obtaining a series of measured capacitances from each of a plurality of capacitance sensors disposed upon a substrate, analyzing a time-varying component of the series of measured capacitances for each respective capacitance sensor to determine a degree of similarity to a stored reference component of a reference signal in which one of the plurality of capacitance sensors is proximate to a stream of an extinguishant, and outputting a signal based upon the analysis and representing a degree of similarity between the series of measured capacitances and the reference signal in which one of the plurality of capacitance sensors is proximate to a stream of an extinguishant.

Those of skill will in the art appreciate that, unless otherwise and expressly indicated, further references to an "extinguishant" will mean a substance used to extinguish a flame, including but not limited to water, solids (such as chemical powder or the like), and foams (such as AFFF or FFFP) as well as any tangible substances used as mock extinguishants in a simulation environment, including but not limited to polystyrene foam, natural or synthetic rubber granules, sawdust, common surfactant foams, and the like. The term proximate will be understood to mean "closest in relationship, or immediate," e.g., proximate to one respective sensor versus other sensors within an array of such sensors.

BRIEF DESCRIPTION OF THE DRAWINGS

FIG. 3 is a perspective view of display devices having arrays of the sensors of FIG. 1 mounted upon, through, or otherwise in contact with a substrate that forms a protective screen for the devices;

FIGS. 6A-D are plots of measured "counts" over a series of samples taken at constant time intervals for (A) a stream of water applied directly to a sensor, (B and C) a stream of water applied proximate to, but not directly at, a sensor, and (D) a stream of water applied away from a sensor so that expended water runs off over the sensor, with reference numbers 172, 174, 176, and 178 identifying a series of measured specific capacitances (left axis scale) and reference numbers 182, 184, 186, and 188 identifying an output signal (right axis scale), and include corresponding plots of a Fourier-transformed signal and a power spectrum density for representative series of measured capacitances within a preselected time window; and FIG. 7 is a flow chart of an exemplary method, with different aspects of more general steps shown as embedded series of substeps.

DETAILED DESCRIPTION

Figure 1:
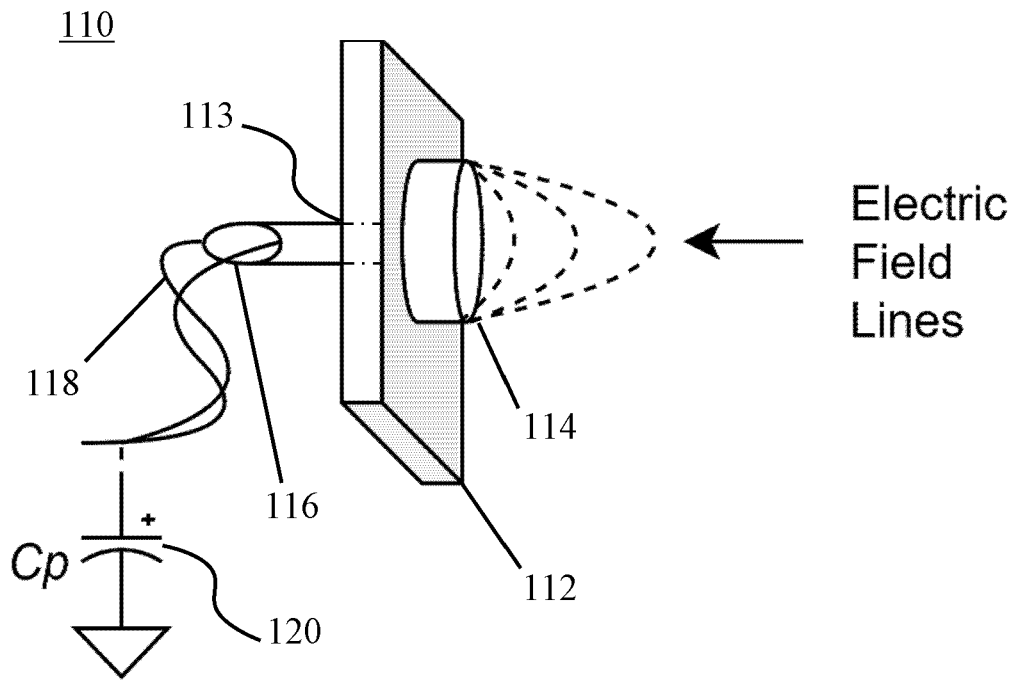
FIG. 1 is a perspective, schematic view of an exemplary sensor of a first aspect of the disclosure.

Beginning with FIG. 1, an individual sensor 110 of an exemplary device is shown for sake of clarity. The sensor 110 includes a substrate 112 and a capacitance sensor element 114 disposed on the substrate. As shown, the sensor element 114 may be disposed upon, or surface mounted upon, the exterior or front surface of the substrate. Measurement wiring 116, shielding or grounding wiring 118 and the like may be passed through an aperture 113 (indicated using broken lines) disposed under the sensor element 114, however it will appreciated that the sensor element may be connected to a controller via wiring, conductive traces, and/or conductive vias. It will be appreciated that the sensor element 114 itself may alternately be disposed upon or within a recess in the substrate 112 such as by, for example, forming a larger blind aperture or through-aperture 113 in the substrate that is sized to receive the element and then securing the element in place by, for example, press-fitting the element within the recess or bonding the sensor to the recess using an adhesive. In this variation the sensor element 114 may be recessed relative to at least a front surface of the substrate 112 so as to provide good sensitivity with moderate mechanical protection. It will also be appreciated that the sensor element 114 may be surface mounted on the substrate on the interior or rear surface of the substrate 112, i.e., the front surface of sensor element 114 may be secured against the interior or rear surface of the substrate. In this variation, aperture 113 may be omitted and the sensor element 114 may be mechanically isolated from any impinging extinguishant to provide excellent protection, however the dielectric properties of and thickness of the substrate 112 may reduce sensitivity, particularly in connection with the detection of indirect streams of extinguishant impacting the substrate remotely from the sensor element.

Figure 2:
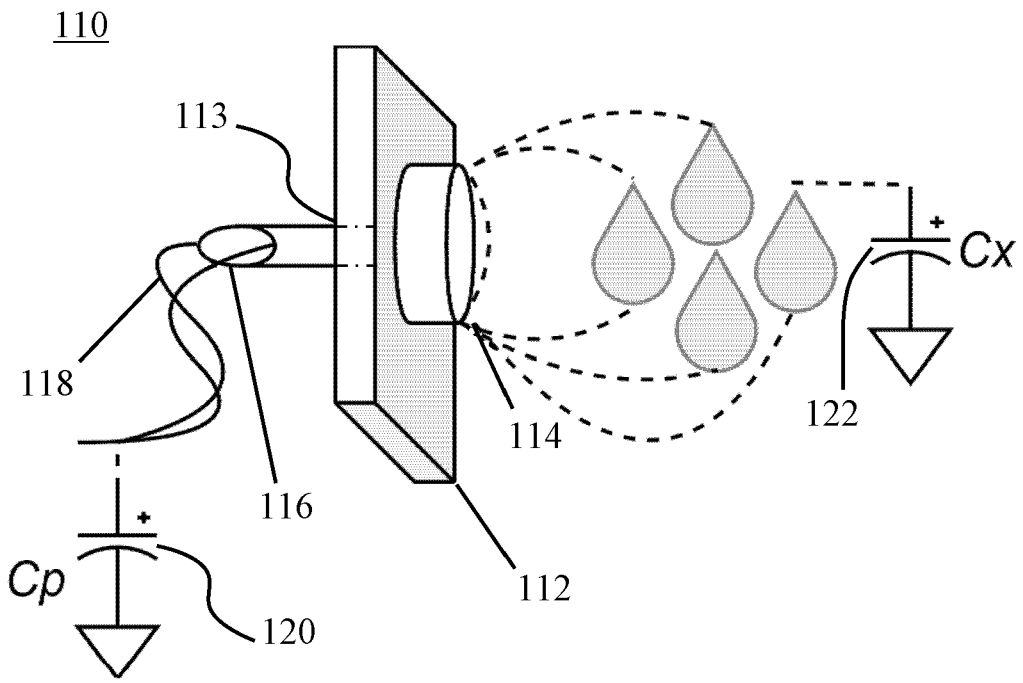
FIG. 2 is a perspective, schematic view of the exemplary sensor of FIG. 1 in close proximity to a stream of fluid, illustrated as water droplets.

As shown in FIG. 1, the sensor 110 itself will have a capacitance 120 which represents a combination of capacitance effects from the substrate 112, the geometry and construction of the sensor element 114, the wiring 116 and 118, and other intrinsic elements. This parasitic capacitance 120 represents a situation in which there is no loss of electric field strength due to another nearby volume of material, such as an extinguishant. Turning to FIG. 2, the presence of a volume of extinguishant within the electric field generated by the sensor element 114 will cause capacitive coupling between the sensor 110 and the extinguishant, such that the measured capacitance additively increases to reflect a combination of the parasitic capacitance 120 of the sensor 110 and the specific capacitance 122 of the volume of extinguishant.

As shown in FIG. 3, the sensor 110 of FIGS. 1-2 is a portion of a larger, unitary substrate 112 or, potentially, a collective assembly or arrangement of individual substrates 112 (as shown) that bear or form a sensor array 130 including a plurality of capacitance sensors 132. The sensor array 130 may be arranged as the nodes of a square or rectangular grid, as the nodes of a tetrahedral staggered grid (as shown), as the nodes of a regular polygonal grid, or even as nodes within an irregular tessellation where the relative locations of the plurality of sensors 110 are known. It will be appreciated that the array 130 may have a varying node density, for example, with nodes concentrated in a predetermined region or regions of the substrate 112. Such predetermined regions may correspond to regions where a simulated flame will "originate" as opposed to regions which may display a background, represent the bulk volume of a simulated enclosed space, or the like. It will be appreciated that the substrate(s) 112 may form an overlay over one or more display devices 12, which may take the form of an LCD, LED, or OLED display, a front- or rear-projected display, or any other form of video display device. Alternately, the substrates 112 may form, overlay, or underlay the surface of dynamically illuminated or even static targets. For example, the substrate(s) 112 may be positioned upon, over, or around display devices 12 or targets to measure applied extinguishant, to resist extinguishant impact forces, and/or to protect the devices or targets from extingishant intrusion. For further example, the substrates may be positioned within a dynamically illuminated target, under an outer surface of the target, as part of a printed circuit board (PCB) or other structure bearing the illumination elements, with potentially reduced sensitivity in connection with the detection of indirect streams of extinguishant impacting the outer surface of the target remotely from the sensor element. As further shown in FIG. 3, a controller 140 is operatively connected to each of the plurality of capacitance sensors 132 to obtain a measured capacitance of each respective capacitance sensor 110.

Figure 4A:
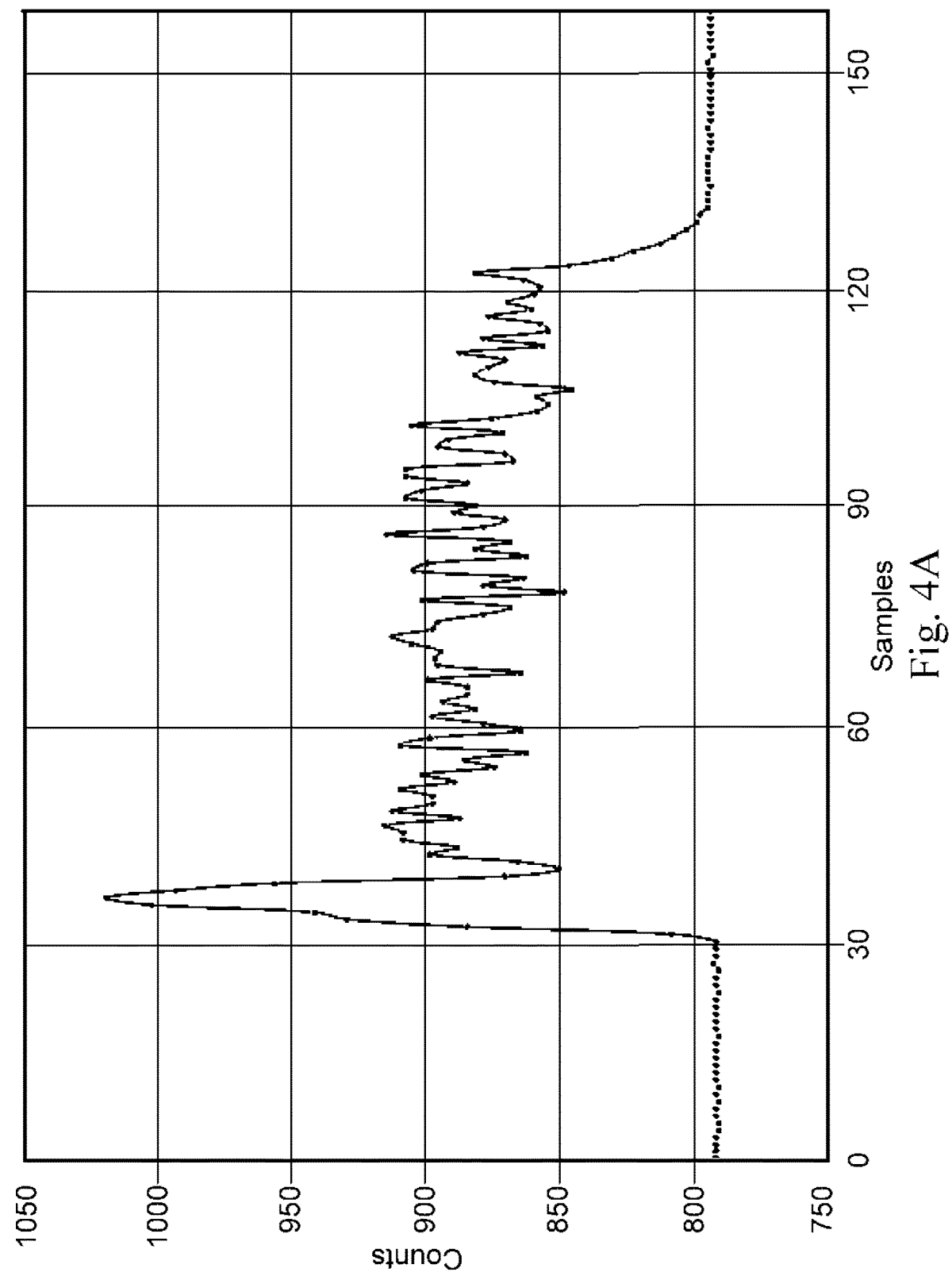
FIGS. 4A-C are plots of measured "counts" (based upon and directly related to detected capacitance) over a series of samples taken at constant time intervals for (A) a stream of water applied directly to a sensor (turbulent flow at the sensor), (B) a stream of water applied away from a sensor so that expended water runs off over the sensor (approximately laminar flow over the sensor), and (C) a steam of water applied between adjacent sensors so that the steam indirectly impinges upon a nearby sensor (an intermediate flow regime)
Figure 4B:
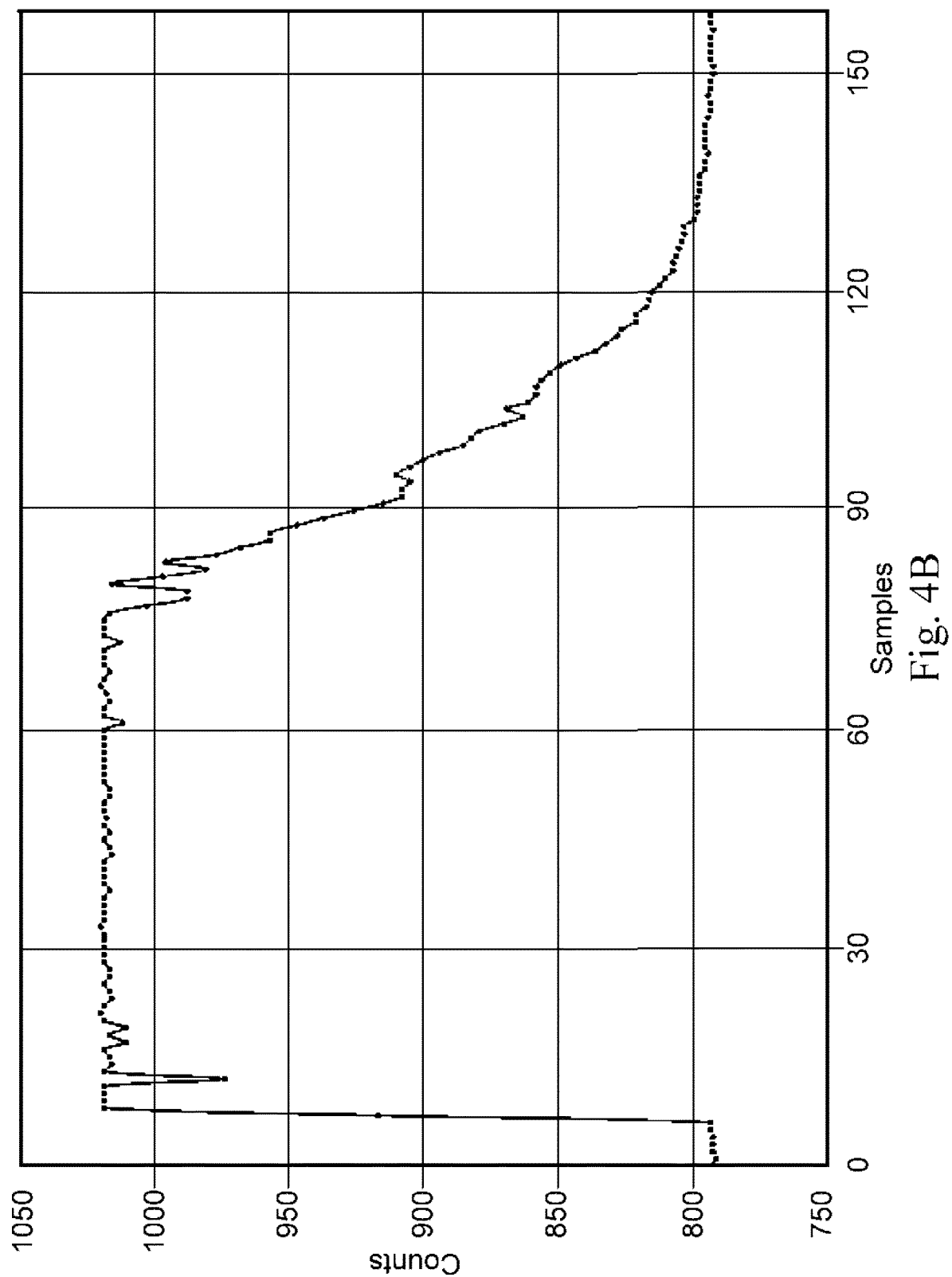
Figure 4C:
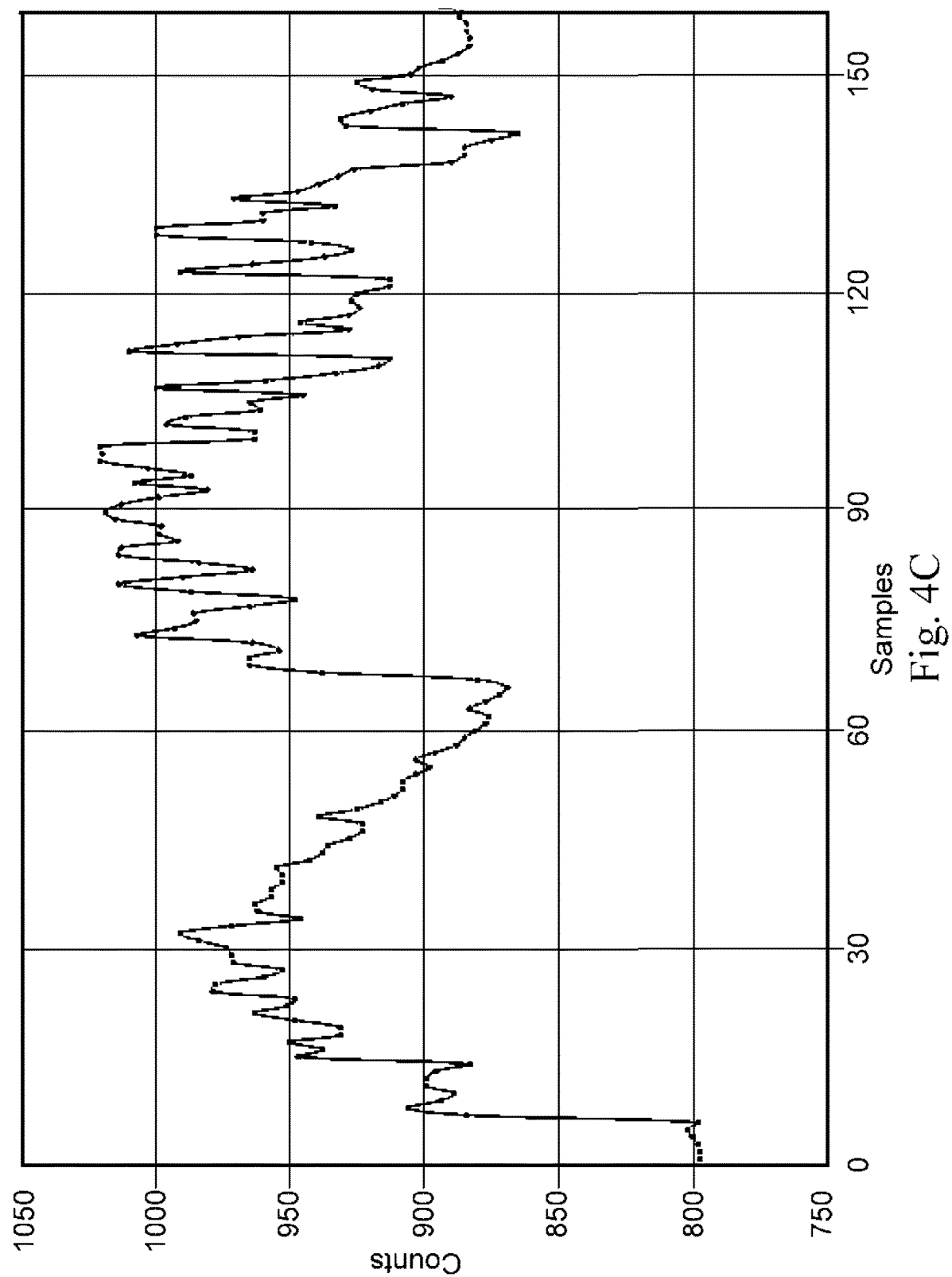

In addition to obtaining (directly, or indirectly via interconnected capacitance-to-digital converters) a measured capacitance of each respective sensor 110, the controller 140 analyzes the measured capacitance in order to determine and output additional information concerning an applied extinguishant. For example, as shown in FIGS. 4A-4C, after removing the parasitic capacitance to create a zero baseline, the measured specific capacitance will vary with the quantity and characteristics of an extinguishant impacting upon or flowing over a respective sensor 110. The figures show a series of measured specific capacitances taken at 33 ms intervals (x-axis, ~30 Hz sampling frequency) and processed into "counts" (y-axis, values related to capacitance after filtering and scaling the sensor output in accordance with a calibration relationship) after pre-processing steps such as, for example, pre-filtering using an infinite impulse response (IIR) filter. In operation, the controller 140 may obtain a series of measured capacitances from a sensor at a relatively high rate, e.g., 10 or more samples per second (10 Hz sampling frequency or 100 ms sampling intervals), preferably 30 samples per second (30 Hz sampling frequency or ~33 ms sampling intervals), and up to 60 samples per second (60 Hz sampling frequency or ~16.7 ms sampling intervals), and analyze a time-varying component of the series of measured capacitances for that sensor 110. The controller 140 may sequentially, essentially simultaneously, or otherwise obtain measurements from each sensor 110 of the plurality of sensors 132 in order to carry out an analysis across the array 130. For example, each sensor 110 may include a so-called capacitance-to-digital converter or capacitive sensor signal interface addressable via a communications bus such as the I2C or SPI busses, and be polled by the controller 140 in a repeating sequential order. For further example, the controller 140 may sample each sensor using an electronically addressed or electromechanically switched network of sensing wires. Other wired or even wireless communications topologies, polling or receipt-based sampling schemes, and sensor- or controller-based analog-to-digital conversion configurations are contemplated and will be readily apparent to those of skill in the art. When a stream or jet of an extinguishant, such as water, is directed at a particular sensor 110, the extinguishant material will form a turbulent mixture with air within the electric field of that sensor, and the spatiotemporally varying dielectric characteristics of the mixture will, as shown in FIG. 4A, create significant time variations within a series of measured capacitances that may be compared to one or more direct-impact-representative reference signals. In contrast, when a laminar flow of an extinguishant, such as water, runs over the sensor 110, the extinguishant will, as shown in FIG. 4B, have a more uniform character, and those more uniform dielectric characteristics will produce a capacitance response with substantially less time variation than the reference signal(s). While the average magnitude of the specific capacitance 122 component of a measurement may generally be similar to that shown in the scenario illustrated and discussed in connection with FIG. 4A, a frequency analysis, e.g., a time-derivative or Fourier-transform or power spectrum based analysis, of the series of measured capacitances will show a significant time-varying component amongst short-term measurements (e.g., a time window≤1000 ms) when the extinguishant is being applied directly to a sensor, as well as a characteristic power spectrum for that variability due to entrained and/or turbulently mixed-in air. Thus, the presence or essential absence of a time-varying component of the measured total capacitance 120 or specific capacitance 122 may be used to discriminate between an extinguishant applied directly upon a sensor and mere runoff or submersion within pooled extinguishant. As shown in FIG. 4C, when a stream or jet of extinguishant is applied proximate to, but not directly upon, a sensor 110 the time-varying component will be present to an intermediate or lesser extent, i.e., the magnitude of turbulence and the contribution of air within the mixture will be reduced with respect to a direct application, and may include periods of almost laminar flow, so that estimates of quantities such as distance between point of impact and a respective sensor may be made.

The controller 140 may thus analyze a series of measured capacitances in order to determine and output a signal representing how closely such a time-varying component matches a stored reference component of a reference signal in which one of the capacitance sensors is proximate to a stream of an extinguishant, with the signal indicative of a direct application to a sensor versus a remote application from the sensor with impinging runoff. Reference signals may be generated by exposing a representative individual sensor 110 to one or more reference streams of an extinguishant that vary in flow rate and mode of application (e.g., type and/or setting of hose nozzle) in order to develop a mathematical relationship, whether deterministic or statistical, between the time-varying specific capacitance 122 component of a series of measured capacitances and the direct application of a reference stream of extinguishant. For example, one reference signal may be obtained by exposing a sensor to a direct stream of extinguishant from a low pressure and high volume source, such as a handline attachment, which will generally result in a reference signal with high-magnitude specific capacitances and relatively lower time-varying components, while another reference signal may be obtained by exposing the sensor to a direct stream of extinguishant from a high-pressure, low-volume source, such as a long-projection nozzle, which will generally result in a reference signal with relatively lower-magnitude specific capacitances and relatively higher time-varying components. Reference signals may also be generated by exposing an individual sensor 110 to runoff or spreading from a remote application, proximate to the sensor 110 or potentially to a different, adjacent sensor, so as to allow for improved interpolation of a point of impact of a stream of extinguishant upon a target. Depending upon sensor element variability, in one variant a representative individual sensor 110 may be exposed in such a manner to develop one or more reference components that are stored and used by the controller 140 for each of the plurality of sensors 132, or in another variant each individual sensor may be so exposed in order to develop one or more individual reference components that may be individually stored and used by the controller 140 for respective ones of the sensors.

In a first aspect of the analysis, the controller 140 may analyze each series of measured capacitances for a time-varying component by calculating a power spectral density of the series within a preselected time window. The controller may then calculate a metric for the series of measured capacitances and calculated power spectral density, such as the spectral centroid of the power spectral density (a mean frequency which divides the spectral density distribution into two equal parts) or a spectral edge frequency of the power spectral density (a frequency which divides the spectral density distribution into a preselected proportion of two parts). The controller may subsequently compare the metric for the series of measured capacitances and calculated power spectral density to the stored reference component, where the stored reference component is the same metric determined for a reference signal in which one of the plurality of capacitance sensors is proximate to a stream of an extinguishant. Finally, the controller may output a signal representing how closely the metric (i.e., the time-varying component of the measured capacitances represented by the metric) matches the stored reference component (i.e., a stored representation of the time-varying component of a reference signal). As an illustrative example, the controller may (1) calculate a power spectral density of the series of measured capacitances within a preselected time window of 1000 ms; (2) calculate a frequency representing the spectral centroid of the power spectral density of the series of measured capacitances; (3) compare the calculated frequency, $f_o$, to the stored frequency of a spectral centroid of the power spectral distribution of a reference signal in which a steam of extinguishant directly impacts a sensor, $f_d$, and the stored frequency of a spectral centroid of the power spectral distribution for a reference signal in which a steam of extinguishant indirectly impinges upon a sensor, $f_i$, using the following equations or rules:

$$\text{For } f_d \leq f_o \leq f_i, RSSI(f_0) = 100\frac{f_i - f_o}{f_i - f_d} \quad \text{(a)}$$

$$\text{For } f_o < f_d, RSSI = 100 \quad \text{(b)}$$

$$\text{For } f_o > f_i, RSSI = 0 \quad \text{(c)}$$

It will be appreciated that other output signal scales, and other rules for interpolation, including other-than-linear rules for interpolation, may be used when outputting a signal representing how closely the metric matches the stored reference component. The distance at which a stream is deemed to indirectly impinge upon a sensor may be determined according to the wishes of the manufacturer or end user, such as a distance sufficient to cause the stream to impact directly upon another, adjacent sensor or the radius of effect of the stream of extinguishant at a point of impact. The controller 140 may then output the RSSI, or received signal strength indicator, to represent how closely the time-varying component of the series of measured capacitances matches that of the reference signal when one of the plurality of capacitance sensors is proximate to a stream of an extinguishant. Those of skill in the art will appreciate that the controller 140 may be separate from or integral to a simulation computer, such that the output of the signal make take the form of a wired or wireless signal transmitted to a simulation computer or merely a parameter output by a controller function for use by the simulation functions of the simulation computer.

Figure 5:
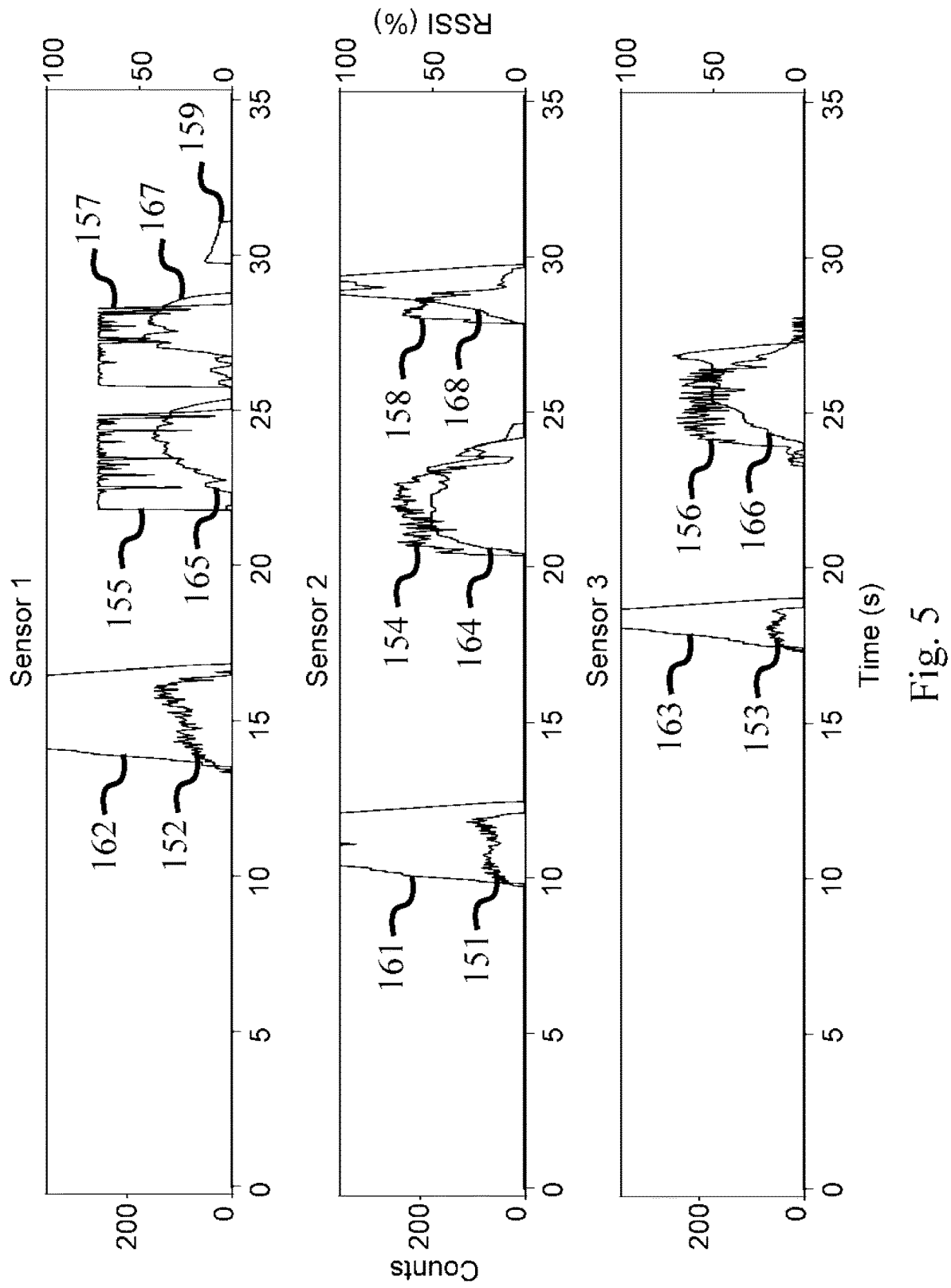
FIG. 5 is a plot of measured "counts" over a series of samples taken at constant time intervals for a stream of water directed at, and subsequently swept within, an array of three sensors, with reference numbers 151-159 identifying a series of measured specific capacitances (left axis scale) and reference numbers 161-168 identifying an output signal (right axis scale)

Referring now to FIG. 5, a time series of measured "counts" and output signal levels (RSSIs) is shown for three sensors 110 respectively labeled "Sensor 1," "Sensor 2," and "Sensor 3." When a stream of extinguishant is initially applied directly to each of the three sensors in turn, first 151, second 152, and third 153, notable series of specific capacitances are measured (as total capacitances, with parasitic capacitances pre-subtracted for clarity of illustration) and analyzed to produce corresponding output signals 161, 162, and 163. Since the stream is applied directly to each respective sensor, the measured specific capacitances have time-varying components that closely match a reference component (stored representation of the time-varying component) of a reference signal such as that shown in FIG. 4A, and the output signal rapidly rises to 100% RSSI at the start of application, then rapidly falls off to 0% RSSI at the end of application. Later in the time series, the stream of extinguishant is directed between the three sensors in sweeping motions, with fourth through eighth notable series of specific capacitances 154, 155, 156, 157, 158, respectively, measured and analyzed to produce corresponding output signals 164, 165, 166, 167, and 168. Since the stream is applied proximate to different sensors at different times, with spreading of the stream upon impact affecting other sensors in addition to the proximate sensor, the measured specific capacitances have time-varying components that resemble those of the signal shown in FIG. 4B, with the proximate sensor having the greatest resemblance to the reference signal shown in FIG. 4A. For the period from time=20 seconds to time=30 seconds, it can be seen that the stream sweeps from proximate Sensor 2 to proximate Sensor 1, then proximate to Sensor 3, then in reverse past Sensor 1 and back to Sensor 2, such that each is generally indirectly exposed to the stream of extinguishant and the output signals 164-168 of roughly 30-60% RSSI reflect that lesser, indirect exposure. Finally, after time=30 seconds, the stream of extinguishant is applied so as to run off over Sensor 1. Since the stream is applied remotely from the sensor, the measured specific capacitances lack a substantial time-varying component amongst short-term measurements, like the laminar flow signal shown in FIG. 4C. There is still a final 159 notable series of specific capacitances due to the presence of runoff, but the corresponding output signal remains essentially at 0% RSSI. It should be appreciated that the series 159 would register as a detection or application of an extinguishant in thermistor-based sensor systems, and even in capacitance-based sensor systems which analyzed only the magnitude of a capacitive response, while the present system discriminates between true and false responses by analyzing the series of capacitances for the short term, time-varying component described above.

Figure 6B:
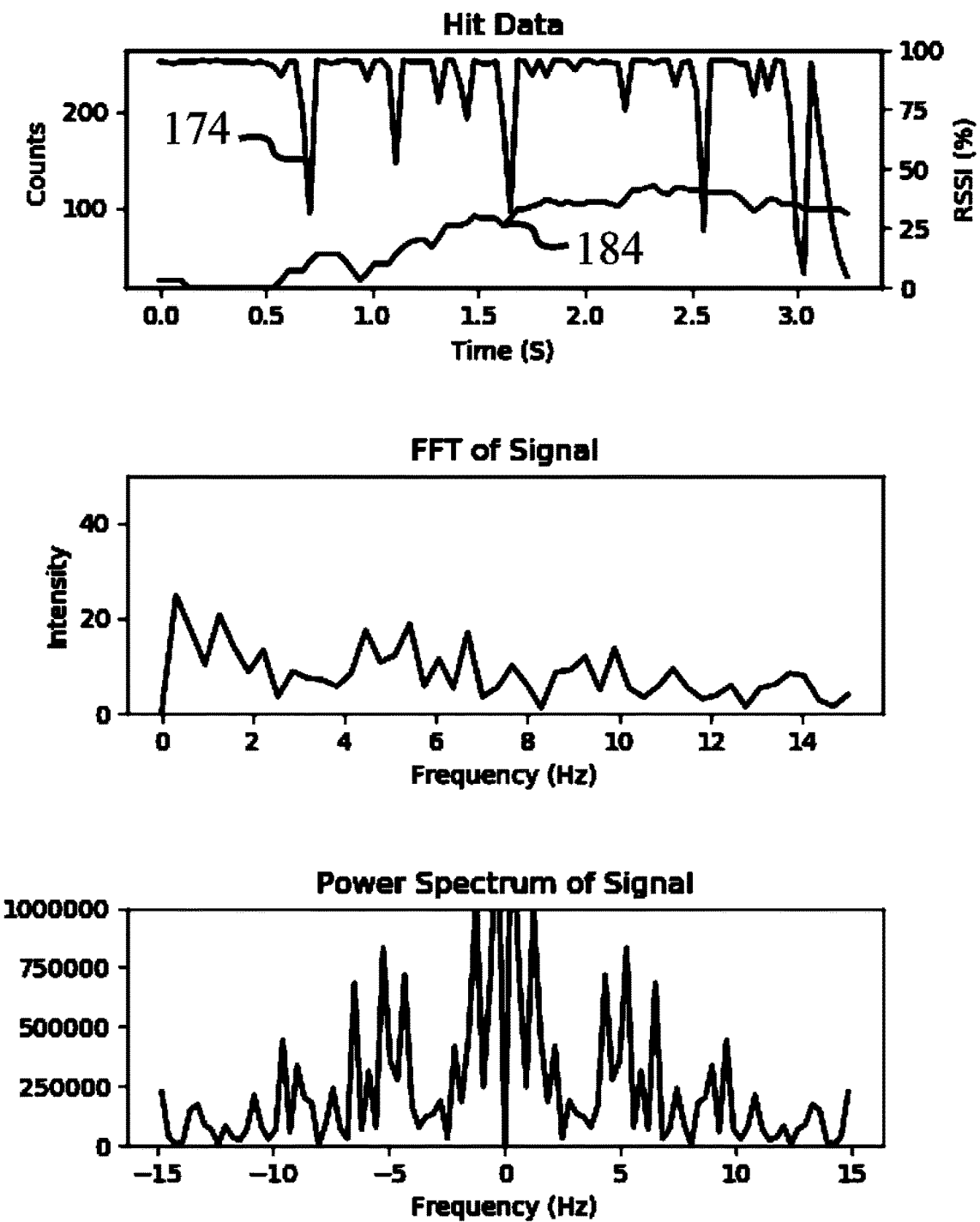
Figure 6C:
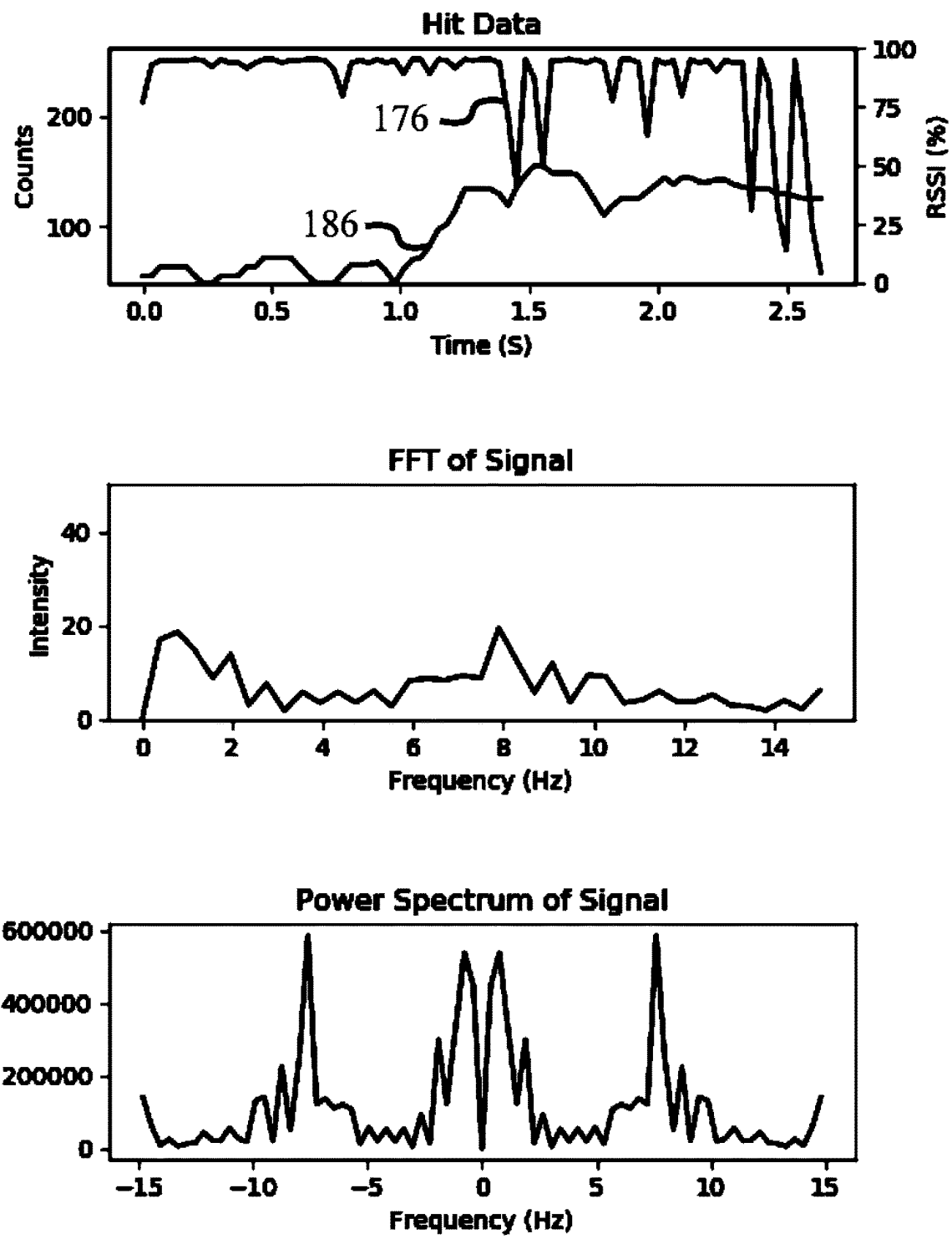

In a second aspect of the analysis, the controller 140 may analyze each series of measured capacitances for a time-varying component by calculating a Fourier transform of the series of measured capacitances within a preselected time window, thus decomposing the series into frequency components that represent aspects of the turbulent flow of the extinguishant. Referring first to FIG. 6A, when a stream of extinguishant is applied directly to a sensor, a measured series of specific capacitances 172 (or total capacitances, with parasitic capacitances pre-subtracted for clarity of illustration) may be obtained and analyzed to produce corresponding signal output levels 182. Since the stream is being applied directly to the sensor, the measured specific capacitances have time-varying components that closely match a stored reference component of the reference signal shown in FIG. 4A, and the output signal 182 rapidly rises to 100% RSSI upon the start of application. As also shown in FIG. 6A, the measured capacitances include substantial time-varying components at frequencies of <10 Hz and predominantly <4 Hz, i.e., significant variations over short time windows of ≤1000 ms. This can be more clearly seen in a power spectrum distribution included at the bottom of the figure. Turning to FIGS. 6B and 6C, when a stream of extinguishant is applied proximate to, but not directly upon, a sensor 110 the measured specific capacitances, 174 and 176 respectively, have time-varying components that resemble those of the signal shown in FIG. 4C, and may be obtained and analyzed to produce corresponding output signals 184 and 186, respectively, of roughly 30-50% RSSI that reflect that lesser, indirect exposure. As also shown in FIGS. 6B and 6C, the measured capacitances include substantial time-varying components that are more spread out within the illustrated frequency range and more substantial at higher frequencies, including in the illustrated case clustering at ~4-10 Hz. This can also be more clearly seen in a power spectrum distribution included at the bottom of figure. Finally as illustrated in FIG. 6D, when a laminar flow of an extinguishant runs over the sensor 110, the series of measured specific capacitances 178 will exhibit an essential absence of time-varying components, as in the signal shown in FIG. 4B, so that the output signal 188 will remain at essentially 0% RSSI. As shown in the additional plots in FIG. 6D, there are essentially no time-varying components amongst short term measurements (≤1000 ms) and an essentially flat and minimal power spectrum distribution (note the greatly reduced scale of the PSD in FIG. 6D versus FIGS. 6A-6C). The controller may thus compare the Fourier transform for the series of measured capacitances to the stored reference component, where the stored reference component comprises a Fourier transform calculated for at least one reference signal in which one of the plurality of capacitance sensors is proximate to a stream of an extinguishant. In some variants, various known methods for comparing the similarity of the Fourier transforms may be employed to determine how closely the Fourier-transformed series (i.e., the time-varying component represented by the Fourier transform) matches the stored reference component, including measures of spectral coherence and scaled correlations. In other variants, the Fourier transforms may alternately be compared, directly or indirectly, by calculating a metric such as a weighted average frequency of the Fourier-transformed spectrum over the preselected time window. For instance, as in the first aspect, the stored reference component may comprise a stored metric calculated for a Fourier transform of at least one reference signal, rather than the Fourier transform itself. The controller 140 may output the result of the comparison (e.g., a magnitude-squared spectral coherence or average correlation coefficient) to represent how closely the time-varying component of the series of measured capacitances matches the stored reference component.

In another aspect of the analysis, the controller 140 may analyze each series of measured capacitances for a time-varying component by calculating time-derivatives of the series within a preselected time window. The time-derivatives may serve as a corollary for frequency spectrum or power spectrum calculations without requiring a frequency transformation. Instead, the controller may calculate a metric for the series of measured capacitances and time-derivatives based upon the number of changes in sign (positive and negative) of the time derivatives, with each change in sign representing when the capacitance signal has changed from locally rising to locally falling and vice versa. It will be appreciated that similar methods are employed for audio or speech processing which calculate a so-called zero-crossing rate for those zero-centered waveforms. The sign change rate (hereafter SCR) is an indicator of an average frequency of, and strongly correlated with a fundamental frequency of, the signal represented by the series of measured capacitances. Thus an exemplary metric may be the SCR, where:

$$SCR = \frac{\sum_{n=1}^{N} f\left(\frac{capacitance_n - capacitance_{n-1}}{t_n - t_{n-1}}\right)}{N} \quad (d)$$

$$f(x) = \begin{cases} 1, & |x| > \text{noise threshold} \\ 0, & \text{otherwise} \end{cases} \quad (e)$$

Other metrics for calculating a SCR, such as counting only positive sign changes, will be apparent to those skilled in the art or otherwise familiar with zero-crossing rate analyses. As shown, Equation (e) may be used in the calculation of the metric via Equation (d) to implement a noise threshold. For example, in calibration, the device may determine the mean or median and standard deviation or variance of the time-derivatives, then store a noise threshold that is, for example, two standard deviations below the mean, for use as a noise threshold when calculating the SCR metric. The controller may subsequently calculate and compare the SCR or similar metric for the series of measured capacitances and time-derivatives to the stored reference component, where the stored reference component is the same metric determined for a reference signal in which one of the plurality of capacitance sensors is proximate to a stream of an extinguishant. Finally, the controller may output a signal representing how closely the SCR or similar metric (i.e., the time-varying component of the measured capacitances represented by the metric) matches the stored reference component (i.e., a stored representation of the time-varying component of a reference signal). As an illustrative example, the controller may (1) calculate a series of time-derivatives from the series of measured capacitances within a preselected time window of 1000 ms; (2) calculate a metric, $SCR_o$, of the time-derivatives of the series of measured capacitances; (3) compare the calculated SCR to the stored SCR of a reference signal in which a steam of extinguishant directly impacts a sensor, $SCR_d$, and the SCR of a reference signal in which a steam of extinguishant indirectly impinges upon a sensor, $SCR_i$, using the following equations or rules:

$$\text{For } SCR_d \leq SCR_o \leq SCR_i, \; RSSI(SCR_0) = 100 \frac{SCR_i - SCR_o}{SCR_i - SCR_d} \quad (f)$$

$$\text{For } SCR_o < SCR_d, \; RSSI = 100 \quad (g)$$

$$\text{For } SCR_o > SCR_i, \; RSSI = 0 \quad (h)$$

Again, it will be appreciated that other output signal scales, and other rules for interpolation, including other-than-linear rules for interpolation, may be used when outputting a signal representing how closely the metric matches the stored reference component. The controller 140 may then output the RSSI, or received signal strength indicator, to represent how closely the time-varying component of the series of measured capacitances matches that of the reference signal when one of the plurality of capacitance sensors is proximate to a stream of an extinguishant.

In general, analysis for the time-varying component of the measured capacitance for the sensor 110 permits the controller 140 to distinguish between an active stream of an extinguishant and, potentially, the proximity or adjacency of the stream of the sensor, versus exposure of the sensor to runoff extinguishant (e.g., in areas substantially below the point of impact of an active stream) or pooled extinguishant (e.g., accumulated extinguishant at the base of a substrate 112 or target). As suggested by FIGS. 5 and 6A-6D, some of the time-varying component (dominant frequency characteristics) will change as the point at which a stream impacts the substrate 112 is moved away from the sensor element 114. Accordingly, analysis of the time-varying component for closeness of match or degree of similarity may be used to determine an approximate distance to an impacting stream of extinguishant from one or more sensors 110. The controller 140 may model measured-capacitance-indicated direct, proximate, and remote stream impacts, e.g., perform triangulation amongst indications of proximate and remote stream impacts within a tessellated network of the plurality of sensors 132, to determine and indicate or output the likely point of impact of an extinguishant amongst the plurality of sensor elements 132 within the sensor array 130. Such modeling can benefit from a rejection of false positive detections due to runoff or pooling of liquids, and even due to the adhesion or piling up of foams.

The device and associated method (described below), by measuring extinguishant application using capacitance rather than temperature, overcome the above-referenced issues with response, temperature control, energy consumption, and discrimination. Capacitance-based sensing does not rely upon the heating of an element to create a temperature differential, upon recovery of the heated temperature after exposure to a high heat capacity extinguishant (such as water) prior to reexposure to the extinguishant (such as during repeated passes over a simulated area of flame), upon control or knowledge of the temperature of the extinguishant, and upon applying bulk energy to overcome the loss of heat to an extinguishant. The high temporal resolution of capacitance sensors also permits the device and method to discriminate between a stream of extinguishant and run-off extinguishant or submersion within pooled extinguishant. It will be appreciated that the device and method have been described as measuring the total or self-capacitance—a combination of parasitic capacitance 120 and specific capacitance 122 of a volume of extinguishant—of individual sensor elements 114 for sake of simplicity, but that the device and method may measure the mutual capacitance—that same combination of parasitic capacitance 120 and specific capacitance 122—of a respective capacitance sensor and at least adjacent sensor element of the plurality the plurality of sensor elements 132 while using the disclosed or other related analytical techniques.

In methods for the detection of a stream of extinguishant, a manufacturer, distributor, or end user of such a device may take advantage of the fact that the powering and calibration of individual sensor outputs can be easily performed due to the use of low current devices sampled by conventional integrated circuits such as A/D and capacitance-to-digital converters. A method 200 may begin by 210 calibrating at least one of a plurality of capacitance sensors 132 disposed upon one or more substrates 112. The calibrating step 210 may include one or more of 212 adjusting the driving power level of a capacitance sensor 110 and 214 estimating the parasitic capacitance 120 of the sensor 110. The driving power level of a sensor 110 may be adjusted by altering the current supplied to a sensor element, where the applicant has found that adjusting the driving power level so that each sensor 110 is baselined at from 70% to 85% of the sensor dynamic range, preferably 75% to 80% of the sensor dynamic range, functions to balance sensor sensitivity (ability to detect volumes of extinguishant at a distance) and sensor resolution (ability to differentiate between varying volumes or rates of application of an extinguishant) for a water extinguishant. It will be appreciated that the baseline may be set higher or lower for other extinguishants depending upon the range of capacitive response expected from a particular extinguishant (between absent and maximally present) in comparison to the parasitic capacitance of the sensor 110 itself. The parasitic capacitance of a sensor 110 may be estimated by measuring the capacitance of the sensor prior to exposure to an extinguishant, or by measuring the capacitance of the sensor after drying or cleaning the sensor, e.g., after adjusting the driving power level of the sensor exposed to a maximally present extinguishant. It will be appreciated that steps 212 and 214 not need to be conducted in sequential order when working with a new extinguishant, and may be iteratively performed in order to optimize use of the sensor's dynamic range.

The calibrating step 210 may also include 216 establishing at least a reference component of a reference signal in which a capacitance sensor 11 is proximate to a stream of an extinguishant. The relationship between total or specific capacitance 120, 122 and time-varying characteristics indicative of a so-called "direct hit" or direct application may be developed by exposing a sensor 110 to one or more reference samples of a stream of extinguishant and obtaining a series of measured capacitances from the sensor. In a first aspect, the step 216 may be performed by calculating a power spectral density of the obtained series of measurements within a preselected time window, then calculating a metric for the series of measured capacitances and calculated power spectral density, and subsequently storing the metric as a reference component for use in an analysis as further outlined below. Examples of such metrics have been provided in the discussion above. In a second aspect, the step 216 may be performed by calculating a Fourier transform of the obtained series of measurements within a preselected time window, then storing the transform as a reference component for use in an analysis as further outlined below. In other aspects, the step 216 may be performed by, for example, calculating a series of time-derivatives for the obtained series of measurements within a preselected time window, then calculating a set of metrics (optionally including statistical metrics, e.g., mean, median, and variance or standard deviation, for noise thresholding) for the series of time-derivatives representative of a time-varying component of the reference signal, and subsequently storing the metrics as reference components for use in an analysis similar to the metric-based analysis of the first aspect. For example, during calibration, the device may determine the mean or median and standard deviation or variance of the time-derivatives over one or more preselected time windows of the reference signal, then either present the operator with an option to select a noise threshold (or, by proxy, a sensitivity setting) or automatically calculate a noise threshold based upon the determined statistics such as, for example, two standard deviations below the mean. The step may progress to calculating a metric such as the SCR metric described above for the series of measured capacitances and calculated time-derivatives, and subsequently storing the metric and noise threshold as reference components for use in an analysis as further outlined below.

It will be appreciated that another calibration step may involve 218 modeling a relationship between the reference component and the distance at which a stream impacts the substrate 112 as the stream is moved away from a sensor element 114. As described above, short term variability in the series of measured capacitances, as analyzed according to the aspects described above or otherwise, will change with separation between the applied stream and a proximate sensor 110, so that variability may be present primarily at relatively higher frequencies with increasing separation between the two points, and with relatively lower power levels as exposure transitions from primarily turbulent flow with direct impact to primarily laminar flow with remote and distant impact, such as in the case of exposure to runoff, and ultimately static exposure, such as in the case of pooled extinguishant. Multiple reference components of multiple reference signals, obtained while applying extinguishant at a point of impact with different known separations from the sensor 110, may be correlated with the known separation to improve any performed triangulation amongst indications of stream impacts within the plurality of sensors 132 and improve an indication or output of a likely point of impact of an extinguishant amongst the plurality of sensor elements 132.

Whether the calibration 210 is performed by a manufacturer, distributor, end user, or other person or entity, operationally the method involves 220 obtaining a series of measured capacitances from each of a plurality of capacitance sensors 132 and then 230 analyzing a time-varying component of the series of measured capacitances for each respective capacitance sensor 110 of the plurality of capacitance sensors 132. As discussed above, when a stream or jet of an extinguishant, such as water, is directed at a sensor 110, the spatiotemporally varying dielectric characteristics of the mixture will produce a characteristic short-term time-varying component due to entrained and/or turbulently mixed-in air. Thus, in a first aspect, the method may involve analyzing each series of measured capacitances for the time-varying component by 232 calculating a power spectral density of the series within a preselected time window. The method may then progress to 234 calculating a metric for the series of measured capacitances and calculated power spectral density, such as the spectral centroid frequency or spectral edge frequency of the power spectral density as discussed above. The method may then progress to 236 comparing the metric for the series of measured capacitances and calculated power spectral density to the stored reference component, where the stored reference component includes the same metric determined (and stored during calibration step 216) for at least one reference signal in which the one of the plurality of capacitance sensors is proximate to a stream of an extinguishant. In other words, the comparing step 236 determines a degree of similarity to a stored reference component of a reference signal in which one of the plurality of capacitance sensors is proximate to a stream of an extinguishant. Finally, the method may involve 238 outputting a signal based upon the analysis (e.g., an RSSI based upon the comparison of metrics, similar to Equations (a)-(c) reported above) and representing a degree of similarity between the series of measured capacitances and the reference signal when one of the plurality of capacitance sensors is proximate to a stream of an extinguishant. An illustrative example of the method, as performed by the controller 140, has been provided above, and it will be apparent that the method, specifically the comparing step 236, may use an additional reference component for another reference signal in which a steam of extinguishant only indirectly impinges upon the sensor (e.g., impacts at a distance sufficient to cause the stream to impact directly upon another, adjacent sensor or to be separated from the sensor by the radius of effect of the stream of extinguishant) so as to establish a lower bound for the closeness of the match.

In a second aspect, the method may involve analyzing each series of measured capacitances for the time-varying component by 240 calculating a Fourier transform of the series of measured capacitances within a preselected time window. The method may then progress to 242 comparing the Fourier transform for the series of measured capacitances to the stored reference component, where the stored reference component (e.g., stored during calibration step 216) includes a Fourier transform calculated for at least one reference signal in which one of the plurality of capacitance sensors is proximate to a stream of an extinguishant. Various known methods for comparing the similarity of the Fourier transforms may be employed to determine a degree of similarity between the signals, including measures of spectral coherence and scaled correlations and metrics such as a weighted average frequency of the Fourier-transformed spectrum over the preselected time window. Finally, the method may involve 244 outputting a signal based upon the analysis (e.g., a magnitude-squared spectral coherence or average correlation coefficient) a degree of similarity between the series of measured capacitances and the reference signal when one of the plurality of capacitance sensors is proximate to a stream of an extinguishant.

In other aspects, the method may involve 246 calculating a series of time-derivatives for the obtained series of measurements within a preselected time window. The method may progress to 248 calculating a metric for the series of time-derivatives of the series of measured capacitances, such as a sign change rate (SCR) as described above, optionally employing a noise reduction threshold based upon statistical metrics determined from a series of measured capacitances during calibration step 216 (such as the mean or median and variance or standard deviation. The method may then progress to 250 comparing the set of metrics for the series of time-derivatives to the same metrics determined (e.g., predetermined and stored during calibration step 216) for at least one reference signal in which one of the plurality of capacitance sensors is proximate to a stream of an extinguishant. Finally, the method may involve 252 outputting a signal based upon the analysis (e.g., an RSSI based upon a comparison between the sets of metrics, similar to Equations (f)-(h) reported above) and representing a degree of similarity between the series of measured capacitances and the reference signal when one of the plurality of capacitance sensors is proximate to a stream of an extinguishant.

In each case, the outputted signal 238, 244, or 252 may indicate to simulation software that a stream of extinguishant is being directed at a particular sensor 110 within a simulated environment, such as a sensor overlaying or provided within a display 12 or target having simulated flaming materials. The outputted signal may, as described above, also indicate to simulation software that the stream of extinguishant comprises or represents a particular quantity of extinguishant (so as to represent an application rate in comparison to an expected rate from, e.g., a handline attachment) or include a relative location within the sensor array 130 at which the stream of extinguishant is estimated to be impacting.

The specific aspects and variants described above are intended to be illustrative in nature, and are not intended to limit the scope of the invention. Additional combinations of the individual features discussed and illustrated above are expressly contemplated and such features are not limited to use in the aspect in which they are introduced unless inherently incompatible with the other aspects as disclosed and described. Any limitations to the invention will appear in the claims as allowed.

What is claimed is:

1. A device for the detection of streams of water or other extinguishants, the device comprising:
   a substrate;
   a sensing array including a plurality of capacitance sensors disposed on the substrate; and
   a controller operatively connected to each of the plurality of capacitance sensors to measure a capacitance of each respective capacitance sensor;
   wherein the controller is configured to analyze a time-varying component of a series of measured capacitances for each capacitance sensor and to output a signal representing how closely that time-varying component matches a stored reference component of a reference signal in which one of the plurality of capacitance sensors is proximate to a stream of an extinguishant.

2. The device of claim 1, wherein the substrate is an element of a collective arrangement of individual substrates bearing the sensing array.

3. The device of claim 1, wherein the sensing array is arranged as the nodes of a grid.

4. The device of claim 3, wherein the sensing array has a varying node density.

5. The device of claim 1, wherein the measured capacitances comprise a mutual capacitance of a respective capacitance sensor and at least one adjacent capacitance sensor of the plurality of capacitance sensors.

6. The device of claim 1, wherein the substrate is positioned within a dynamically illuminated target, under an outer surface of the target.

7. The device of claim 1, wherein the controller is configured to calculate a power spectral density of the series within a preselected time window, then calculate a metric for the calculated power spectral density.

8. The device of claim 7, wherein the controller is configured to compare the metric for the calculated power spectral density to the stored reference component, and wherein the stored reference component includes the same metric determined for at least one reference signal in which the respective one of the plurality of capacitance sensors is proximate to a stream of an extinguishant.

9. The device of claim 1, wherein the controller is configured to calculate a Fourier transform of the series of measured capacitances within a preselected time window, then compare the Fourier transform to the stored reference component, wherein the stored reference component comprises a Fourier transform of at least one reference signal in which the respective one of the plurality of capacitance sensors is proximate to a stream of an extinguishant.

10. The device of claim 9, wherein the comparison includes a calculation of spectral coherence or scaled correlation.

11. The device of claim 1, wherein the controller is configured to calculate a series of time-derivatives for the series of measurements within a preselected time window, then calculate a metric for the series of time-derivatives.

12. The device of claim 11, wherein the controller is configured to compare the metric for the series of time-derivatives to the stored reference component, and wherein the stored reference component includes the same metric determined for at least one reference signal in which the respective one of the plurality of capacitance sensors is proximate to a stream of an extinguishant.

13. A method for detecting streams of water or other extinguishants, the method comprising the steps of:
obtaining a series of measured capacitances from each of a plurality of capacitance sensors disposed upon substrate;
analyzing a time-varying component of a series of measured capacitances for each respective capacitance sensor to determine a degree of similarity to a stored reference component of a reference signal in which one of the plurality of capacitance sensors is proximate to a stream of an extinguishant; and
outputting a signal based upon the analysis and representing a degree of similarity between the series of measured capacitances the reference signal in which one of the plurality of capacitance sensors is proximate to a stream of an extinguishant,
wherein the analyzing step further comprises calculating a power spectral density of the series within a preselected time window, calculating a metric for the calculated power spectral density, and comparing the metric for the calculated power spectral density to the same metric determined for at least one reference signal in which the respective capacitance sensor is proximate to a stream of an extinguishant.

14. The method of claim 13, wherein the metric is a spectral centroid frequency or spectral edge frequency of the power spectral density.

15. The method of claim 14, wherein the analyzing step further comprises calculating a Fourier transform of the series of measured capacitances within a preselected time window, and comparing the Fourier transform for the series of measured capacitances to a Fourier transform calculated for at least one reference signal in which the respective capacitance sensor is proximate to a stream of an extinguishant.

16. The method of claim 15, wherein the comparison comprises a measure of spectral coherence.

17. A method for detecting streams of water or other extinguishants, the method comprising the steps of:
obtaining a series of measured capacitances from each of a plurality of capacitance sensors disposed upon substrate;
analyzing a time-varying component of a series of measured capacitances for each respective capacitance sensor to determine a degree of similarity to a stored reference component of a reference signal in which one of the plurality of capacitance sensors is proximate to a stream of an extinguishant; and
outputting a signal based upon the analysis and representing a degree of similarity between the series of measured capacitances the reference signal in which one of the plurality of capacitance sensors is proximate to a stream of an extinguishant.

18. The method of claim 17 wherein the analyzing step further comprises calculating a series of time-derivatives for the series of measurements within a preselected time window, calculating a set of statistical metrics for the series of time-derivatives of the series of measured capacitances, and comparing the set of metrics for the series of time-derivatives to the same metrics determined for at least one reference signal in which the respective capacitance sensor is proximate to a stream of an extinguishant.

19. The method of claim 17, wherein the analyzing step further comprises calculating a series of time-derivatives of the series of measured capacitances, calculating a metric for the series of time-derivatives, and comparing the metric for the series of time-derivatives to the same metric determined for a series of time-derivatives calculated from at least one reference signal in which the respective capacitance sensor is proximate to a stream of an extinguishant.

20. The method of claim 19, wherein the metric is a sign change rate of the series of time-derivatives of the series of measured capacitances.

* * * * *

UNITED STATES PATENT AND TRADEMARK OFFICE
CERTIFICATE OF CORRECTION

| | |
|---|---|
| PATENT NO. | : 11,376,459 B2 |
| APPLICATION NO. | : 16/943714 |
| DATED | : July 5, 2022 |
| INVENTOR(S) | : Brian P. Bradley |

It is certified that error appears in the above-identified patent and that said Letters Patent is hereby corrected as shown below:

In the Claims

Claim 17, Column 16, Lines 24-39 reads:
"A method for detecting streams of water or other extinguishants, the method comprising the steps of:
obtaining a series of measured capacitances from each of a plurality of capacitance sensors disposed upon substrate;
analyzing a time-varying component of a series of measured capacitances for each respective capacitance sensor to determine a degree of similarity to a stored reference component of a reference signal in which one of the plurality of capacitance sensors is proximate to a stream of an extinguishant; and
outputting a signal based upon the analysis and representing a degree of similarity between the series of measured capacitances the reference signal in which one of the plurality of capacitance sensors is proximate to a stream of an extinguishant."
Should read:
-- A method for detecting streams of water or other extinguishants, the method comprising the steps of:
obtaining a series of measured capacitances from each of a plurality of capacitance sensors disposed upon substrate;
analyzing a time-varying component of a series of measured capacitances for each respective capacitance sensor to determine a degree of similarity to a stored reference component of a reference signal in which one of the plurality of capacitance sensors is proximate to a stream of an extinguishant; and
outputting a signal based upon the analysis and representing a degree of similarity between the series of measured capacitances the reference signal in which one of the plurality of capacitance sensors is proximate to a stream of an extinguishant,
wherein the analyzing step further comprises calculating a power spectral density of the series within a preselected time window, calculating a metric for the calculated power spectral density, and comparing the metric for the calculated power spectral density to the same metric determined for at least one reference signal in which the respective capacitance sensor is proximate to a stream of an extinguishant. --

Signed and Sealed this
Twenty-fifth Day of April, 2023

Katherine Kelly Vidal
*Director of the United States Patent and Trademark Office*